United States Patent [19]
Almeida et al.

[11] Patent Number: 6,008,808
[45] Date of Patent: Dec. 28, 1999

[54] TOOLS FOR DATA MANIPULATION AND VISUALIZATION

[75] Inventors: Gorete Almeida, Ottawa; Vincent Somoza, Kanata, both of Canada

[73] Assignee: Nortel Network Corporation, Canada

[21] Appl. No.: 09/002,009

[22] Filed: Dec. 31, 1997

[51] Int. Cl.⁶ .................................................. G06F 15/00
[52] U.S. Cl. ........................................................ 345/339
[58] Field of Search .................... 345/419, 339, 345/355, 356, 357

[56] References Cited

U.S. PATENT DOCUMENTS 5,808,611  9/1998  Johnson et al. ........................ 345/349
5,812,654  9/1998  Anderson et al. ...................... 379/207

*Primary Examiner*—Phu K. Nguyen
*Attorney, Agent, or Firm*—Finnegan, Henderson, Farabow, Garrett & Dunner, L.L.P.

[57] ABSTRACT

Data manipulation and visualization tools for organizing, managing and navigating through complex data. The tools retrieve and manipulate this data through graphical user interface software executed by a computing device. Using the graphical user interface, a user may browse through multiple simulated layers of complex data, display a plurality of complex data in one or more simulated layers on a single screen, or view historical traffic performance information for a predefined time period.

20 Claims, 14 Drawing Sheets

6,008,808

TOOLS FOR DATA MANIPULATION AND VISUALIZATION

BACKGROUND OF THE INVENTION

The present invention relates generally to software tools, and more particularly to software tools with accompanying apparatus for manipulating and visualizing complex data.

The ability to interpret, manage and navigate through large amounts of complex data is critical for industries relying on immediate access to information. For example, in the communications industry, wireless service providers must manage and maintain large amounts of data pertaining to cellsite operation and subscriber information. In high traffic urban areas, service providers use multiple RF voice channels to support a high density of callers. Typically, service providers use several antennas arrange vertically or radially on a cellsite tower to provide service coverage for these urban areas. Each antenna provides RF propagation coverage for a sector of the cellsite. To effectively monitor service coverage, a service provider must track RF propagation patterns for each antenna at the cellsite. This task can be very complex and confusing if the service provider cannot organize high volumes of RF propagation data in a usable format. Currently, service providers do not have access to a data manipulation and visualization tool for organizing and presenting complex data in a user-friendly format. This problem exists in other industries as well, where users often have difficulty sorting through multiple layers of complex data.

Users also have difficulty viewing and manipulating different types of related complex data on a single display screen. For example, the ability to view different types of related complex data on a single display screen is important when comparing multiple DNA sequences or evaluating RF propagation characteristics between a cellsite tower and service providers. Current systems designed to display large volumes of data on a single screen are often complex and difficult to follow. In addition, these systems create undesirable noise that adversely affects the clarity of the displayed information. Therefore, a need exists for a tool that allows a user to display and manipulate a plurality of data on a single screen without visual complexity and unnecessary noise.

Certain industries rely on historical performance data to troubleshoot or plan around unique problems. For example, the air transportation industry often reviews prior aircraft flight patterns to improve current air traffic control conditions. Moreover, meteorologists use prior weather patterns to predict future weather conditions. Although historical performance data provides important information to a user, current technology does not allow a user to realize the full benefit of this information. With regard to the air transportation industry, air traffic controllers do not have a tool for viewing simulated air traffic patterns over time. By viewing simulated air traffic patterns over time, air traffic controllers can see how the patterns change during high peak periods and make appropriate adjustments. Hence, there is a need for a tool that not only allows a user to view and manipulate historical performance data over time, but adapts to a variety of applications.

Therefore, it is desirable to provide a tool for organizing and browsing through multiple layers of complex data.

It is also desirable to provide tool that allows a user to display and manipulate a plurality of data on a single screen without visual complexity and unnecessary noise.

It is further desirable to provide a tool that allows a user to view and manipulate historical performance information over time, and adapts to a variety of applications.

Additional desires, features and advantages of the invention are set forth in the following description, apparent from the description, or may be learned by practicing the invention.

SUMMARY OF THE INVENTION

Systems and methods consistent with the present invention meet these desires by providing software tools for visualizing and manipulating complex data.

Specifically, a data manipulation and visualization tool, comprises means for storing a plurality of data corresponding to a plurality of distinct information layers; means for representing the plurality of distinct information layers as a plurality of integrated visual images on a single display screen; means for selecting one of the integrated visual images; and means for simulating a characteristic of the distinct information layer corresponding to the selected integrated visual image.

A method for data manipulation and visualization comprises the steps of storing a plurality of data corresponding to a plurality of distinct information layers; representing the plurality of distinct information layers as a plurality of integrated visual images on a single display screen; selecting one of the integrated visual images; and simulating a characteristic of the distinct information layer corresponding to the selected integrated visual image.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings:

FIG. 3b is a display information manager software tool for controlling the image intensity of simulated cellsite data shown in FIG. 3a;

FIG. 3c is a cellsite tuning software tool for tuning one or more antennas located in the simulated cellsite of FIG. 3a;

FIG. 5b is a simulated cross-sectional view of radio frequency (RF) propagation at the cellsite illustrated in FIG. 5a;

DETAILED DESCRIPTION OF THE INVENTION

Reference will now be made in detail to the construction and operation of preferred embodiments consistent with the present invention that are illustrated in the accompanying drawings. In those drawings, like elements and operations are designated with the same reference numbers.

Embodiments consistent with the present invention are directed to software tools for manipulating and visualizing complex data. These software tools include a display information manager, cellsite tuner, cross-sectional viewer, data browser, cellsite data browser, and historical traffic performance viewer. Each of these tools include graphical user interfaces that are adaptable to a variety of applications relating to telecommunications, medicine, geography, or any other field that involves organizing, managing, and manipulating large amounts of complex data. For implementation purposes, the data manipulation and visualization tools described herein are directed to wireless communications technology, and more particularly, to network management systems for cellsites employing wireless communications technology. Where appropriate, alternative embodiments consistent with the present invention are described herein to identify other applications for the data manipulation and visualization tools. The alternative embodiments provide only a few examples of data manipulation and visualization tool applications and are not intended to be comprehensive.

Figure 1:
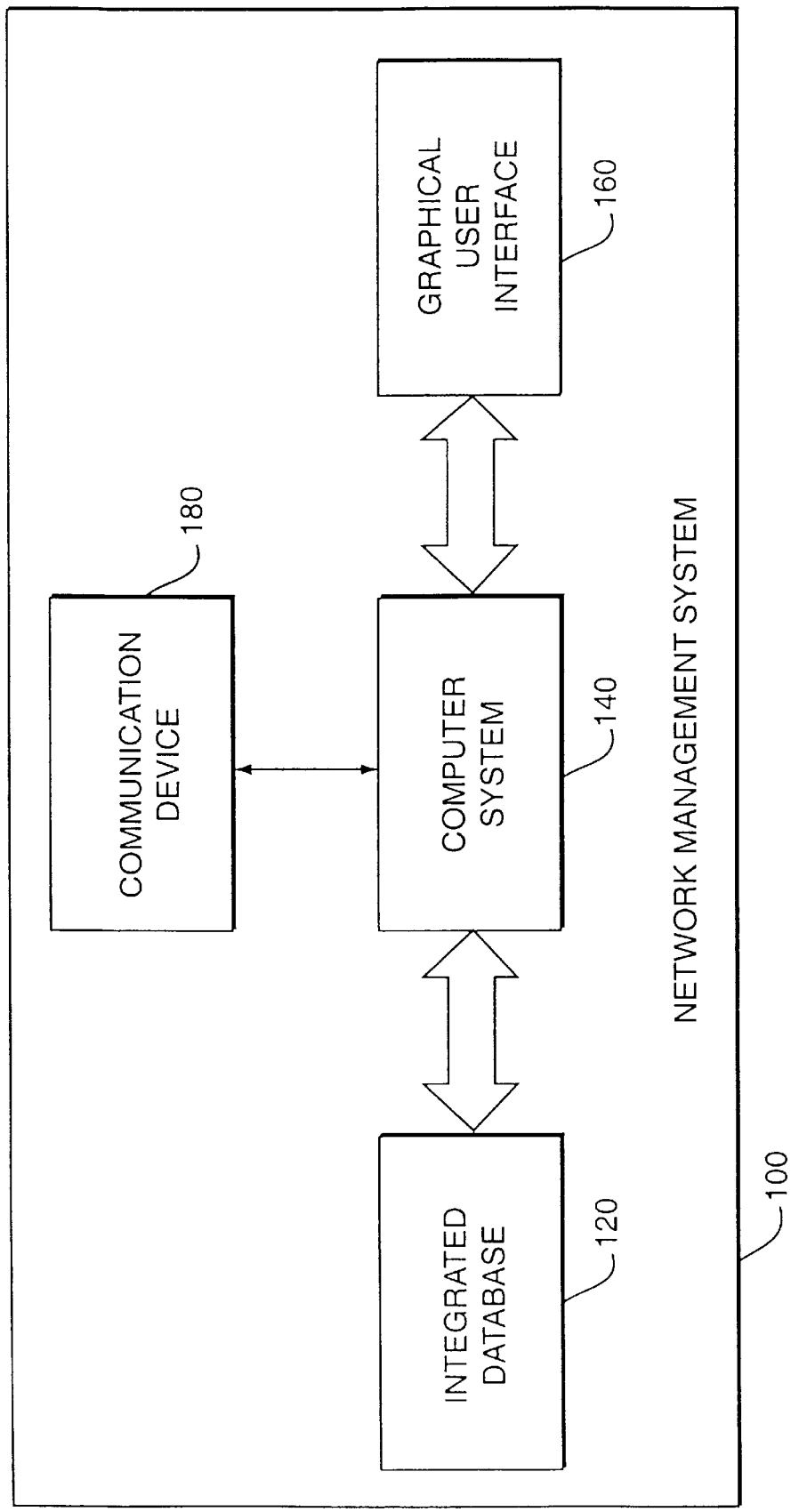
FIG. 1 is a block diagram illustrating a network management system consistent with the present invention.

FIG. 1 illustrates a network management system 100 consistent with the present invention. Network management system 100, located remotely or at a cellsite, provides a user (e.g., network manager) with the ability to simulate cellsite planning and operation using one or more of the above-noted software tools. The system includes an integrated database 120, computer system 140, graphical user interface 160, and communication device.

Integrated database 120 includes a variety of data corresponding to a cellsite (e.g., topographical data, architectural data, and RF propagation data). Database 120 preferably resides on a memory device, such as a hard drive, for storing large amounts of information. Data that is stored in database 120 may be updated or modified in any manner to maintain current cellsite information. In addition, database 120 may be expandable to accommodate additional information corresponding to one or more cellsites. Preferably, database 120 stores cellsite data in an integrated format to allow a user to retrieve and view different categories or types of cellsite data simultaneously. The data may include two-dimensional images (e.g., maps, plans, and photographic images), three-dimensional images (e.g., architectural clutter, and mechanical surface geometry), and operational measurements (e.g., data streams and formulas).

Computer system 140 is a high performance computer capable of processing complex graphical information. To achieve high performance, computer system 140 preferably includes a Pentium® processor (or equivalent) or greater, a memory, such as random access memory, and a high resolution display. Computer system 140 may be a stand alone computer or may be connected to a network having high performance capabilities (e.g., 100 base-t or ATM25). In addition, computer system 140 supports platform independent languages such as Java and HTML. Commercially available simulator software, such as software developed by Paradigm Simulations, Inc., can be executed on computer system 140 to simulate data received from database 120. The simulated data can be superimposed on one another and are viewable on a display of computer system 140 using a graphical user interface.

Graphical user interface 160 is a software program executed by computer system 140 that allows a user to manipulate data viewed on the display of computer system 140. Each software tool described herein uses graphical user interface 160 for data manipulation. To facilitate data manipulation, a mouse, keyboard, or other similar input device may be used. Graphical user interface 160 allows a user to interact with displayed data to change conditions or operations of the cellsite. Preferably, graphical user interface 160 is user-friendly (e.g., Windows-based) to allow the user to retrieve, manipulate, and display cellsite information effectively on computer system 140 by simply selecting or controlling one or more icons using an input device.

Communication device 180 communicates information between system 100 and a remote site. Specifically, communication device 180 retrieves information for storage, manipulation or simulation (e.g, RF propagation data) and sends system 100 information to a remote site. For example, when a network manager makes simulated changes to a cellsite antenna on system 100, the changes can be communicated to a cellsite through communication device 180 for implementation. Communication device 180 can be a wireless or wireline device depending on the application environment of system 100.

Figure 2:
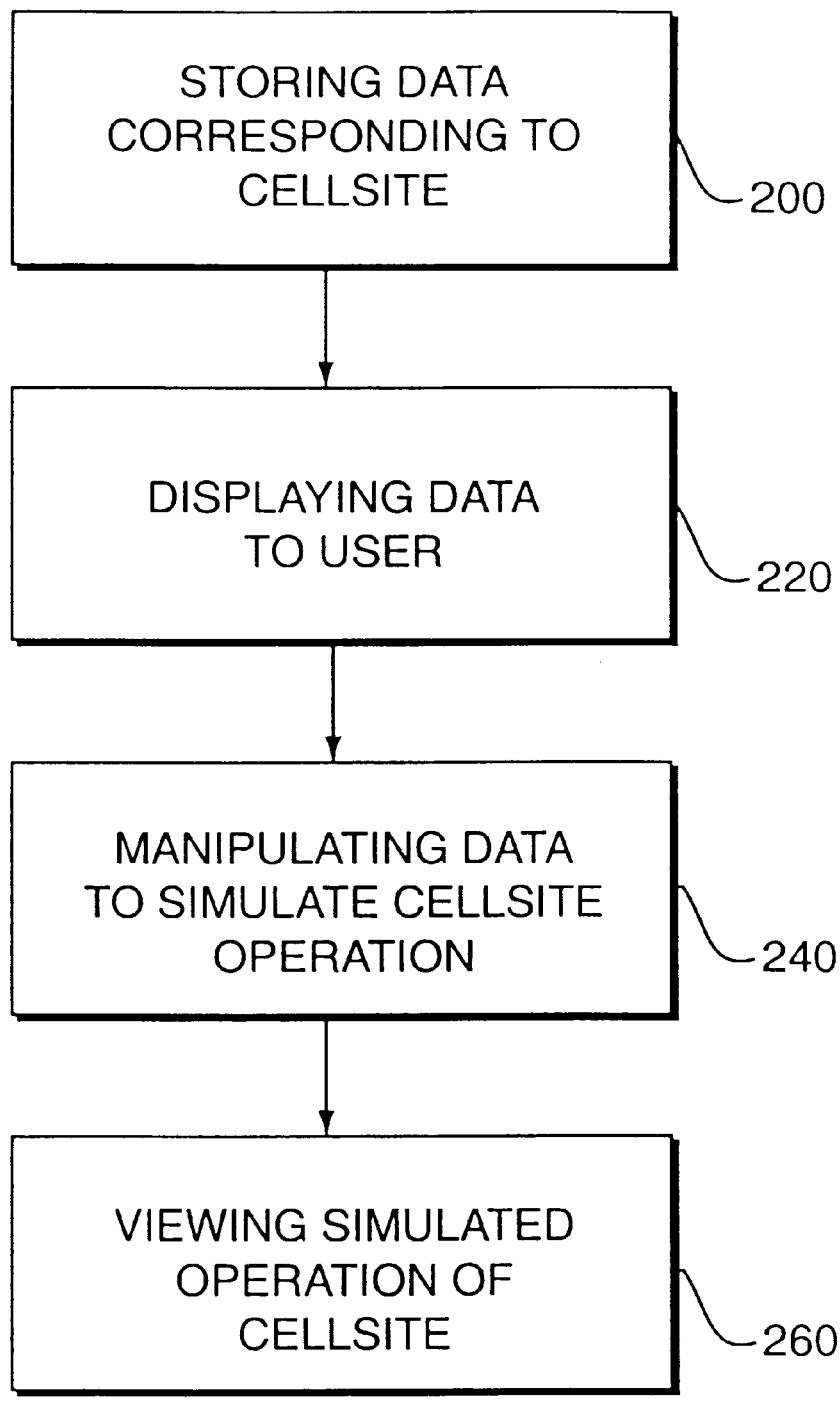
FIG. 2 is a flowchart illustrating a method of data manipulation and visualization consistent with the present invention.

FIG. 2 is a flowchart illustrating a method of data manipulation and visualization consistent with the present invention. Initially, database 120 stores cellsite data, such as topographical, architectural and RF propagation data (step 200). Computer system 140 then retrieves and displays the data to a user (step 220). Subsequently, the user can manipulate data using graphical user interface 160 to simulate cellsite conditions or operations (step 240). Upon obtaining an optimum simulated cellsite condition or operation, a user can view the simulated condition or operation of the cellsite (step 260). In this manner, network management system 100 allows the user to simulate certain operations of a cellsite before making any manual adjustments to cellsite hardware (e.g., an antenna or power amplifier). This allows for more accurate cellsite planning and operation while reducing the amount of time needed to make cellsite adjustments.

Figure 3A:
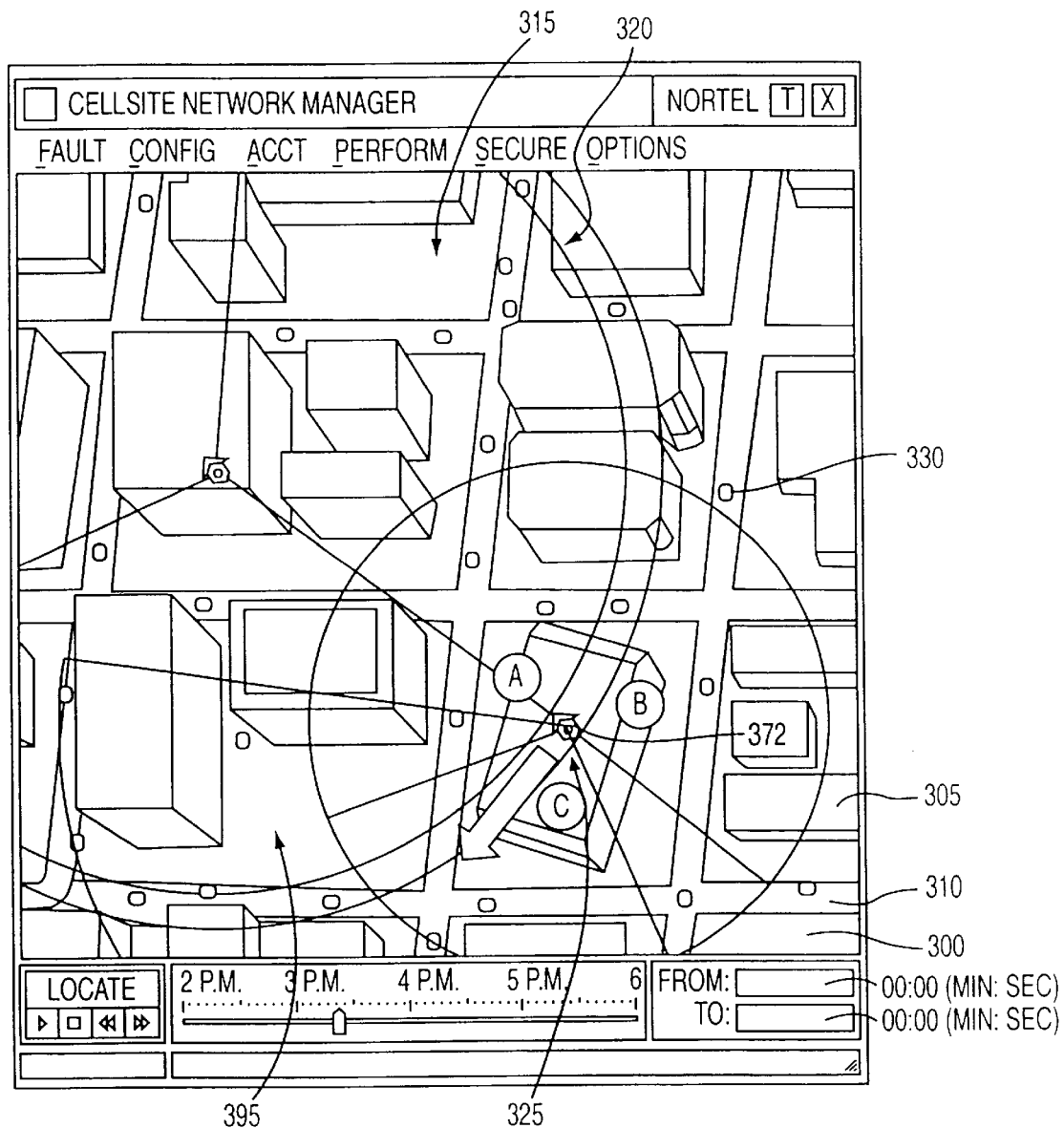
FIG. 3a illustrates a plurality of simulated cellsite data consistent with the present invention.

FIG. 3a illustrates a plurality of simulated cellsite data consistent with the present invention. The cellsite data include topographical data 300, architectural data 305, street map data 310, radio frequency propagation data 315, surround line of site terrain data 320, cellsite location data 325, and subscriber data 330. These data are gathered and stored in database 120.

Topographical data 300 provide a topographical view of the geographical area in which the cellsite is located. Architectural data 305 provide an aerial view of buildings and other similar architecture located in or around the cellsite. Street map data 310 allow the user to view the street configuration within and around the cellsite. Topographical, architectural, and street map data are obtained by commercially known methods or from commercially available databases.

RF propagation data 315 provide an aerial view of RF coverage at a cellsite. Computer system 140 displays RF propagation data 315 as transparent to enable viewing of other cellsite information, such as topographical, architectural and street map data. Sonar mapping equipment (e.g., a radio receiver linked with a very precise timing system) may be used to measure and record RF propagation data at the cellsite. This equipment may also be used to determine the border or outer perimeter of RF coverage at the cellsite which is stored as surround line of site terrain data 320. Cellsite location data 325 illustrate the cellsite from which one or more antennas send and receive RF signals to provide wireless communication services to subscribers.

Computer system 140 displays each subscriber as a circle of varying size depending on the accuracy of the signal throughout and around the cellsite. Preferably, subscriber data 330 includes information about a subscriber and the subscriber's location within or around the cellsite. One or more of a service provider's database, enhanced 911 support system, or global positioning system (GPS) may be used to generate subscriber data 330. Alternatively, other commercially known approaches may be used to obtain a subscriber's location within a defined geographical area.

Once computer system 140 displays the cellsite data stored in database 120, as shown in FIG. 3, the network manager can manipulate the data using one or more of the software tools. For controlling how the cellsite data appears on a display of computer system 140, the network manager can use a display information manager software tool.

The display information manager software tool is a filtering application, as described below in greater detail, that allows a user to view and manipulate a plurality of comparative visual data simultaneously on one screen. Using this software tool, a network manager can filter the quantity and control the opacity of the data displayed on computer system 140. As with the other software tools described herein, the display information manager software tool can be adapted for any application that involves viewing and manipulating a variety of complex data in an integrated format. For example, these applications may include air and ground traffic control, weather reporting, radio/television/ data networks, and scientific applications such as molecular and biological modeling.

Figure 3B:
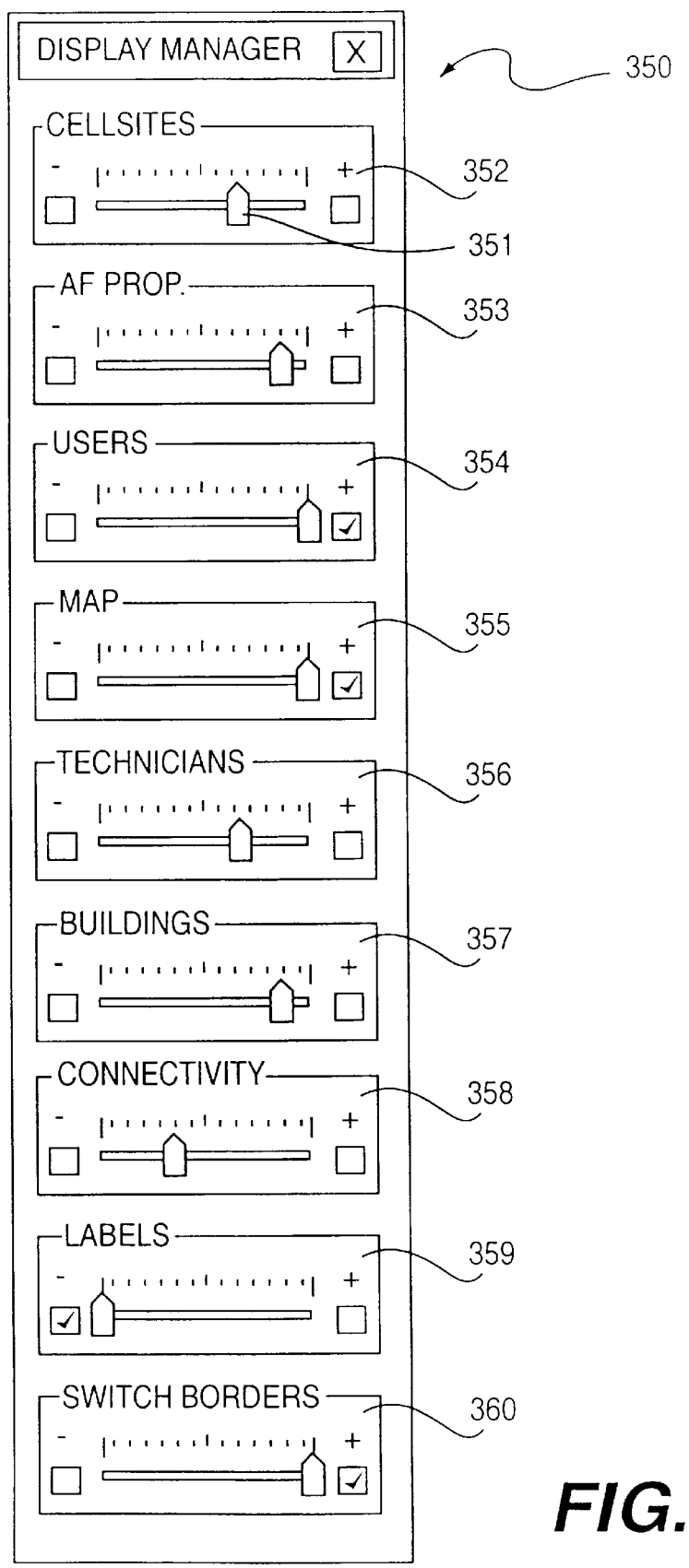

FIG. 3b illustrates one application of the display information manager software tool for controlling how computer system 140 displays the each type of cellsite data shown in FIG. 3a. In this example, computer system 140 displays the plurality of data in layers with the top layers being transparent in order to view all layers simultaneously. Transparent layering allows a network manager to simulate adjustments to the cellsite and view the impact of the adjustments on other cellsite data. Specifically, a network manager can view the cellsite data identified in FIG. 3b and adjust the intensities of these data using display information manager software tool control screen 350. By adjusting slider bars 351, the network manager can view cell site data 352, RF propagation data 353, user or subscriber data 354, map data 355, technician data 356, buildings or architectural data 357, connectivity data 358, labels 359, and switch borders 360. Control screen 350 also provides visual effects, such as check marks, for indicating to the network manager that a particular parameter intensity is at its highest or lowest position. In FIG. 3b, control screen 350 provides this indication for user data 354, map data 355, labels 359, and switch borders 360. The flexibility of turning on or off any particular cellsite parameter allows the network manager to visualize the interaction between various cellsite parameters. This function further allows the network manager to provide an accurate, efficient, and effective evaluation of a cellsite and implement proper adjustments to ensure optimum cellsite planning and operation for subscribers. One of these adjustments may include tuning one or more antennas at the cellsite to modify existing RF propagation patterns.

Figure 3C:
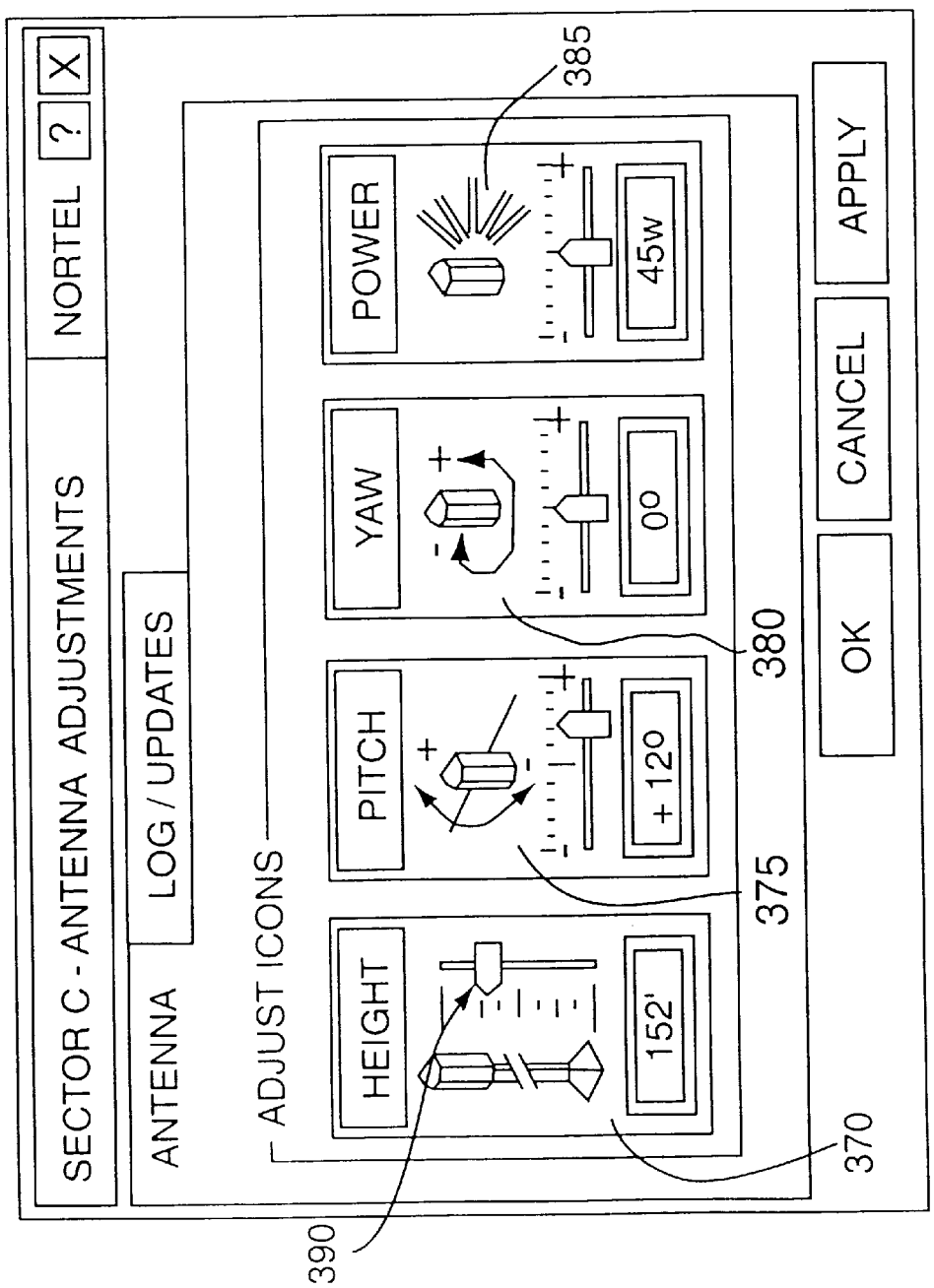

To simulate cellsite tuning operations, a network manager can use the cellsite tuning software tool. The cellsite tuning software tool allows a network manager to simulate adjustments to a cellsite antenna and communicate these adjustments to the actual cell site operator in order to manually adjust the antenna on-site. In implementing this feature, a network manager, either stationed at the cellsite or remotely located, acquires RF propagation data for a particular sector. The RF propagation data allows a network manager to view RF coverage for a particular sector of the cellsite, as illustrated in FIG. 3a. Using graphical user interface 160 (shown in FIG. 1), the network manager can view a control screen, shown in FIG. 3c, for changing simulated cellsite conditions shown in FIG. 3a. Control screens for graphical user interface 160 vary depending on the desired cellsite operation the network manager chooses to modify. In FIG. 3c, for example, the network manager can make simulated antenna adjustments to various parameters that control RF propagation for a cellsite. The control screen in FIG. 3c includes a height icon 370, pitch icon 375, yaw icon 380, and power icon 385.

Height icon 370 allows a network manager to adjust the height of a simulated antenna 372 shown in FIG. 3a. Changing the height of simulated antenna 372 may also change other simulator parameters at the cellsite, such as RF coverage and border position.

Pitch icon 375 controls the simulation of the antenna pitch which is antenna revolution about a lateral axis. Yaw icon 380 controls the simulation of the antenna yaw which is antenna revolution about a vertical axis. Finally, power icon 385 allows the network manager to simulate an increase or decrease of antenna power intensity (i.e., simulating an adjustment to a power amplifier connected to the antenna). By increasing or decreasing the power, a cellsite antenna can transmit a stronger or weaker signal, respectively. The network manager can control the height, pitch, yaw and power by dragging a slider bar 390 (e.g., using a mouse pointer) between a first and second position. Each icon displays a numerical value associated with the position of the slider. By using the cellsite tuning software tool described herein, a network manager can see the effects of any adjustments made to a cellsite antenna.

As the network manager adjusts the parameters in FIG. 3c, computer system 140 displays changes in RF coverage as an adjusted RF propagation signal 395 shown in FIG. 3a. The network operator can view the adjustments and make any necessary changes. Upon reaching a satisfactory adjustment to the antenna using the simulator, the network operator saves these changes in a memory and preferably communicates them to the cellsite in real-time (e.g. through a wireless communications link). Upon receiving these changes at the cellsite, an on-site technician makes the actual changes to the antenna or power amplifier consistent with the simulated changes. Preferably, an antenna mounting bracket for supporting the antenna includes calibrated markings that allow the technician to accurately make the requested adjustments to antenna height, yaw and pitch either electronically or manually. Alternatively, the simulated changes may be communicated to an automated system, such as a robotic system, that adjusts the cellsite equipment (i.e., the antenna and power amplifier) accordingly.

Network management system 100 has advantages over systems that require an on-site technician to physically make changes to an antenna and then test to see if the changes yield the desired results. This trial and error approach is very time consuming and also may not provide the most accurate cellsite adjustments. The broad range of data available through network management system 100 allows the network manager to plan adjustments based on actual cellsite characteristics. For example, viewing architectural as well as topographical data associated with the cellsite allows a network manager to see where possible transmission problems occur. In systems without the simulation capability, a technician may not be able to view from the cellsite where these obstructions or potential problems exist. The method of tuning an antenna at a cellsite using network management system 100 is described in detail below.

Figure 4:
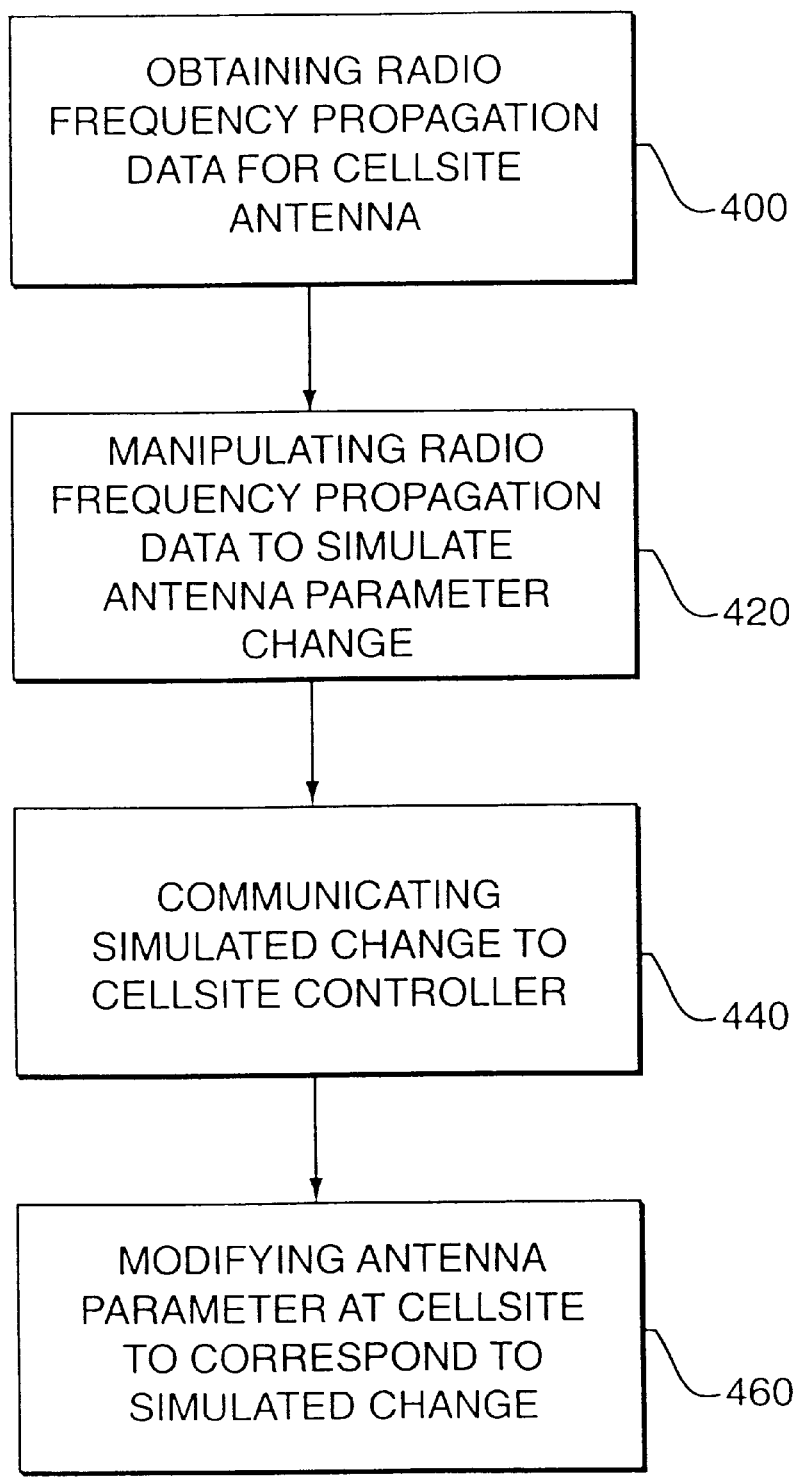
FIG. 4 is a flowchart illustrating a method of tuning an antenna at a cellsite.

FIG. 4 provides a flowchart for illustrating a method of tuning an antenna at a cellsite consistent with the present invention. Initially, the network manager obtains RF propagation data measured at the cellsite (step 400). The network manager then manipulates the RF propagation data on computer system 140 to simulate an antenna parameter change at the cellsite (step 420). Subsequently, the simulated change is communicated to a cellsite controller (e.g., an on-site technician or computer controller), (step 440). Upon receiving the simulated change information from the network manager, the cellsite controller then makes actual adjustments to the cellsite hardware (i.e., antenna) to conform to the simulated changes (step 460). This method may be repeated for other parameters that require adjustment or modification at the cellsite.

Figure 5A:
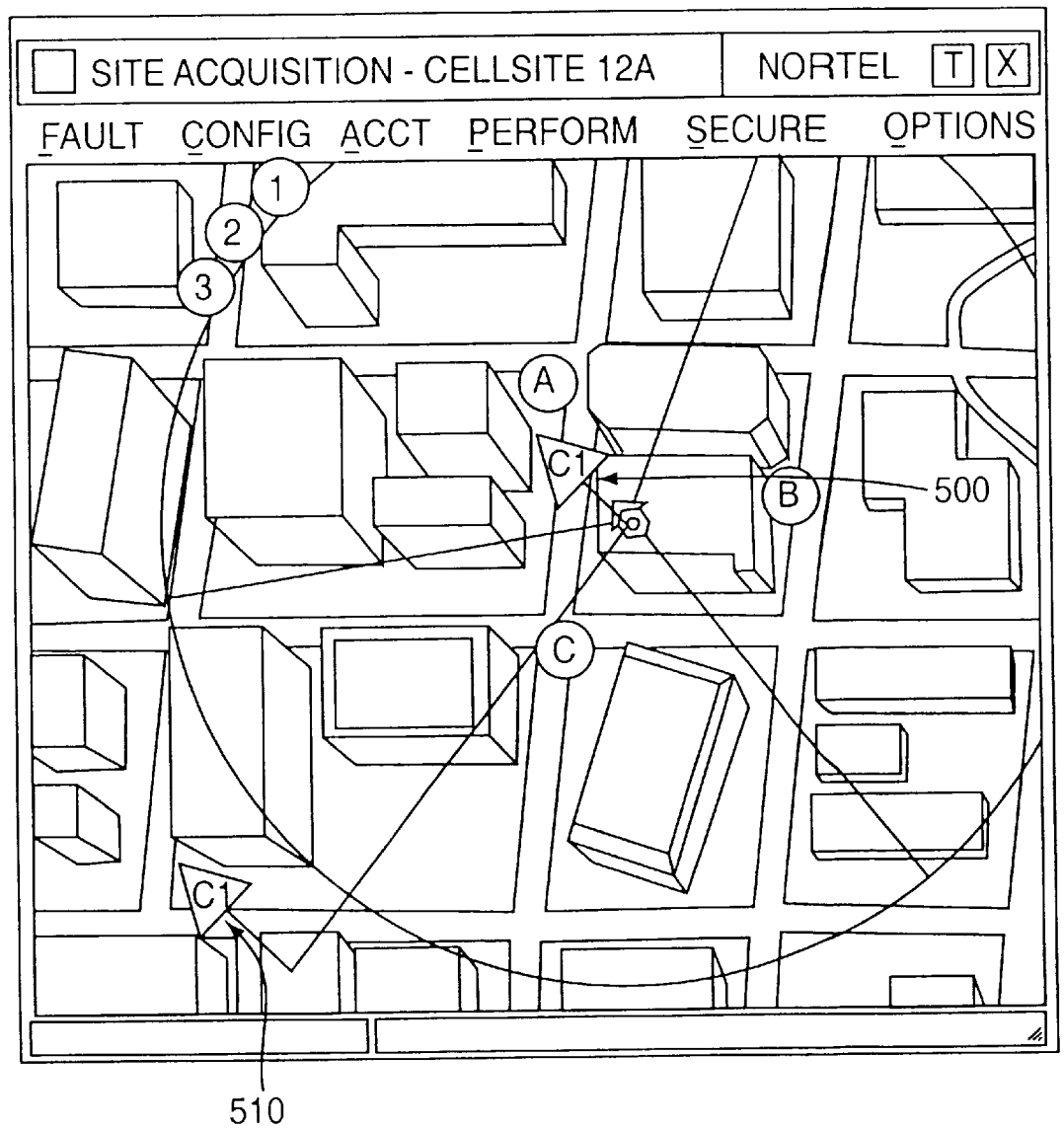
FIG. 5a illustrates a cross-sectional viewer software tool for simulating a cross-sectional view of RF propagation at a cellsite consistent with the present invention.

FIG. 5a illustrates a cross-sectional viewer software tool for simulating a cross-sectional view of RF propagation at a cellsite consistent with the present invention. The cross-sectional viewer software tool allows a network manager to obtain detailed views of RF propagation data in a variety of planes. Typically, network managers are unable to account for all possible RF obstructions or interferences from a plan view alone. By having access to both cross-sectional and plan views, the network manager can effectively plan and troubleshoot RF propagation problems. To facilitate viewing RF propagation coverage, the network manager has access to other cellsite data such as topographical and architectural information shown in FIG. 5a. In this example, the cellsite includes three different sectors labeled A, B, and C.

Figure 5B:
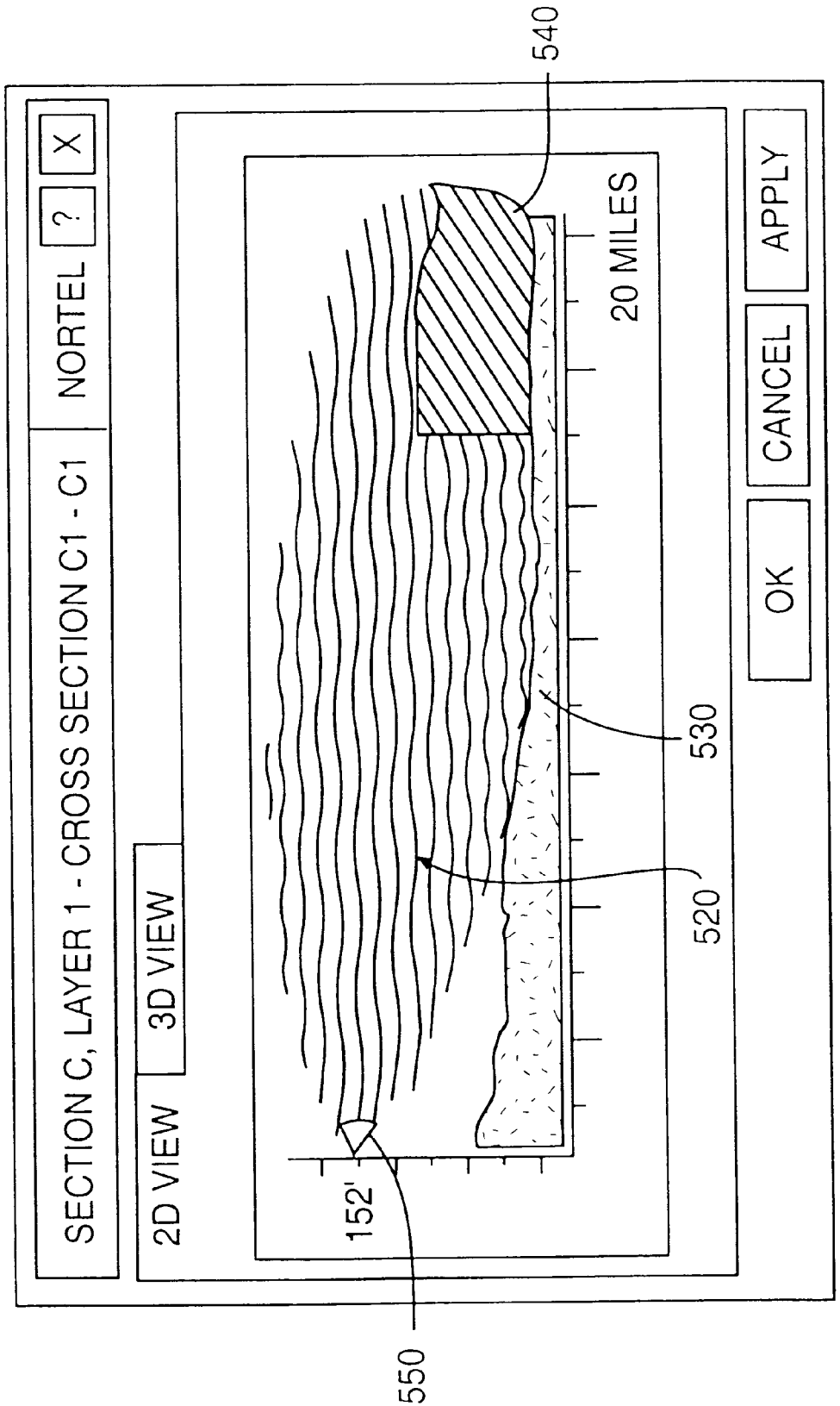

The cross-sectional viewer software tool allows the network manager to select an area of the simulated cellsite for a more detailed view. To select the desired area, the network manager chooses two reference points in the cellsite area. A first reference point 500, illustrated in FIG. 5a, is normally located in an area adjacent a cellsite antenna. A second reference point 510 is located in an area adjacent the boundary of RF propagation coverage. Preferably, the network manager selects the first and second reference points by mouse clicking each point. After the points are selected, the cross-sectional viewer software tool provides the network manager with a cross-sectional view of RF propagation coverage, as illustrated in FIG. 5b. In this figure, the simulated view includes an RF propagation wave 520 transmitted by an antenna 550, topographical data 530, and architectural data 540. FIG. 5b also includes a scale for antenna height and antenna distance from a point of reference on the display. In this example, the antenna is at a height of 152 feet and is approximately 16 miles away from an architectural obstruction. The cross-sectional illustration of RF propagation coverage may be represented in an absolute or relative scale. This simulated information allows a network manager to simply adjust antenna 550 to compensate for the obstruction. Typical network systems are unable to provide this level of detail to a network manager.

Figure 6:
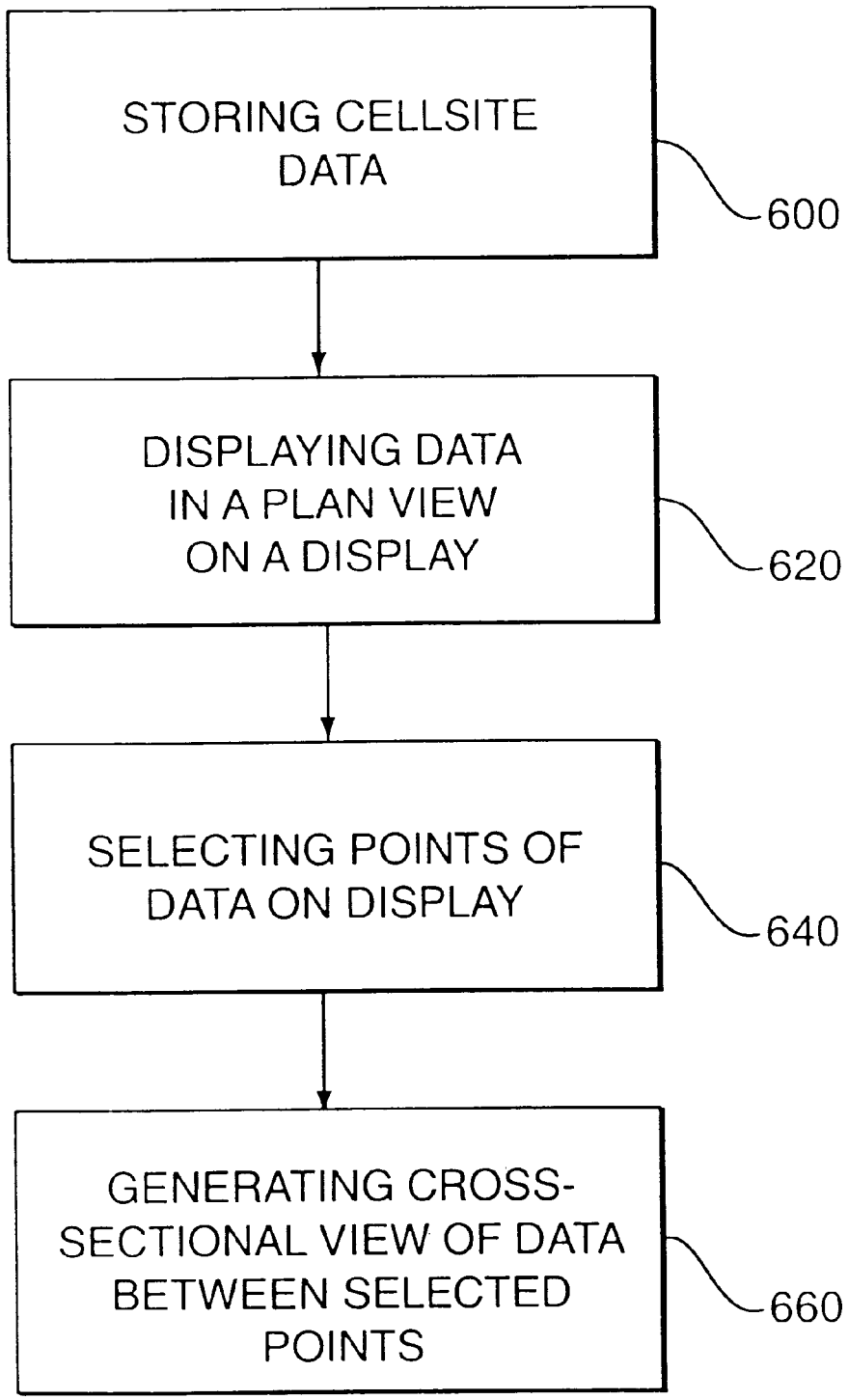
FIG. 6 is a flowchart illustrating a method of selecting a cross-sectional area of a cellsite for viewing.

FIG. 6 is a flowchart illustrating a method of selecting a cross-sectional RF propagation area of a cellsite for viewing in a manner similar to that illustrated in FIGS. 5a and 5b. The method begins by storing cellsite data in database 120 (step 600). As described above, cellsite data are obtained by commercially available systems and processes capable of electronically representing geographical area and RF propagation data. Upon acquiring the necessary information, the network manager can display the data in plan view on a display of computer system 140 (step 620). Using graphical user interface 160, the network manager can select two reference points of data on the display to view a cross-sectional area of the RF coverage between the selected reference points (step 640). Network management system 100 then generates a cross-sectional view of RF coverage between the selected points on computer system 140 (step 660). Network management system 100 also allows the network manager to select other cross-sectional views of RF coverage at the cellsite by selecting additional reference points. Essentially, the network manager can manipulate a wide variety of data to effectively simulate cellsite operation.

Figure 7:
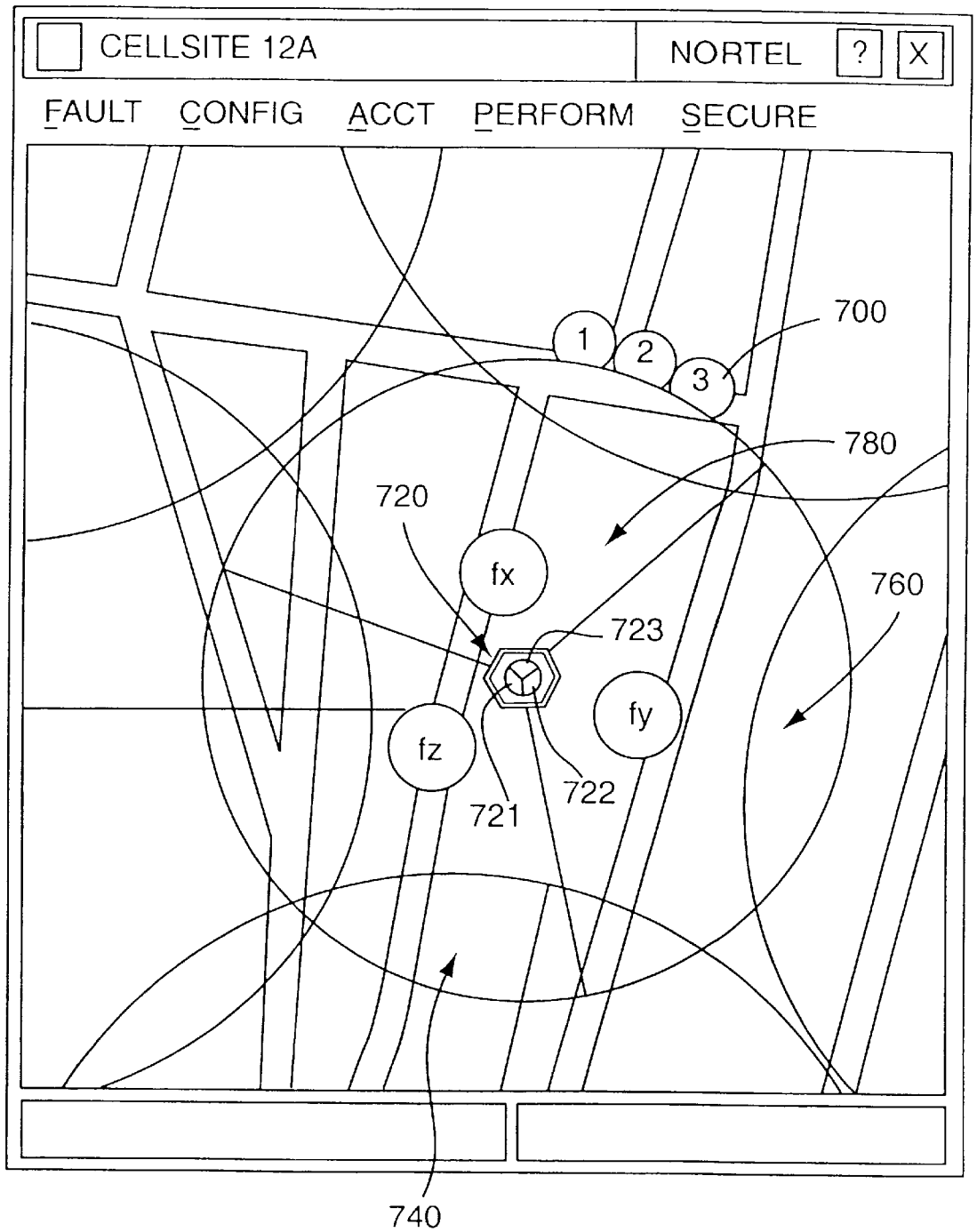
FIG. 7 illustrates a sector cellsite browser software tool for simulating a plurality of RF propagation layers corresponding to respective antenna groupings at a cellsite consistent with the present invention.
Figure 8:
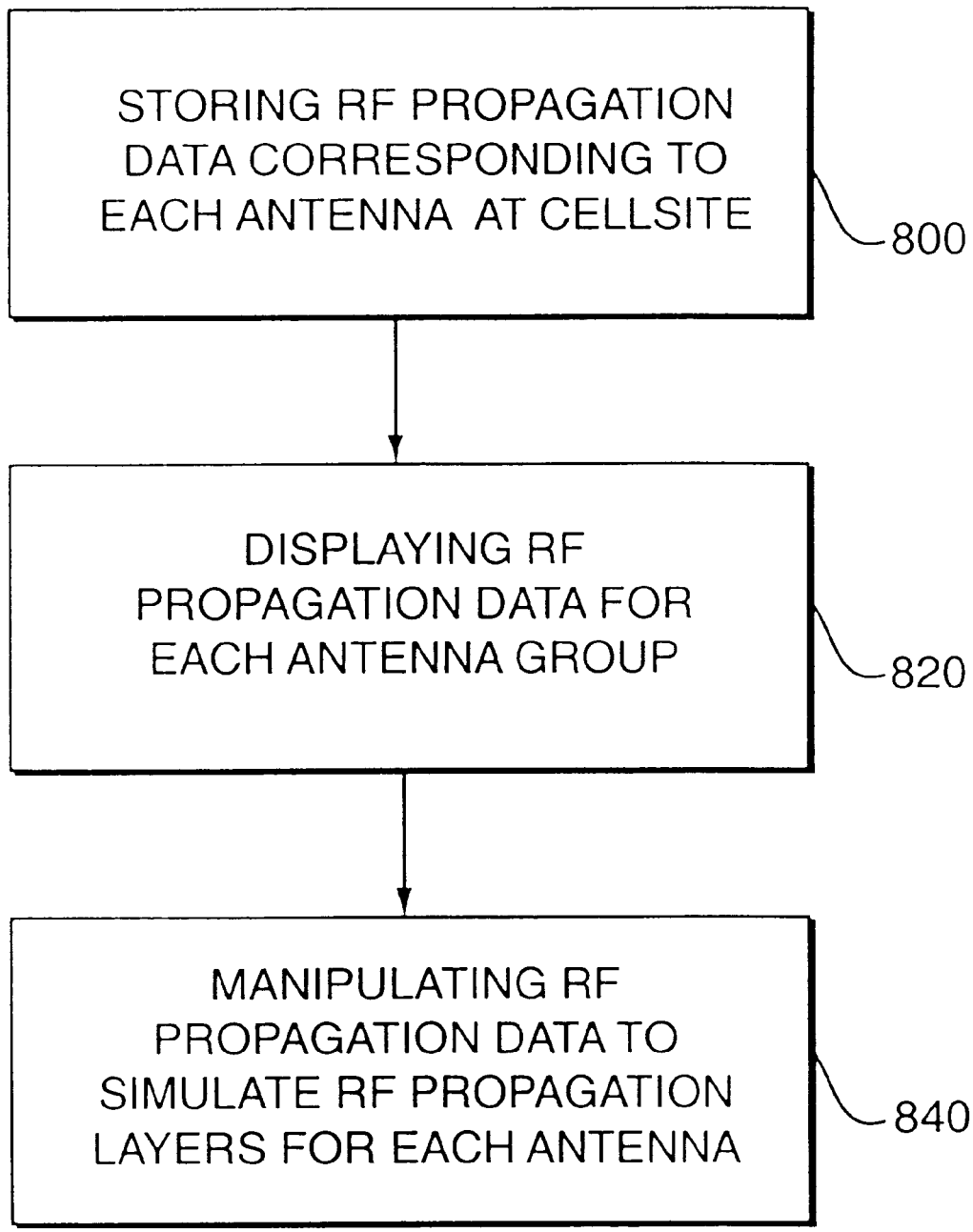
FIG. 8 is a flowchart illustrating a method of manipulating and displaying RF propagation data for one or more selected antenna groups at a cellsite.
Figure 9:
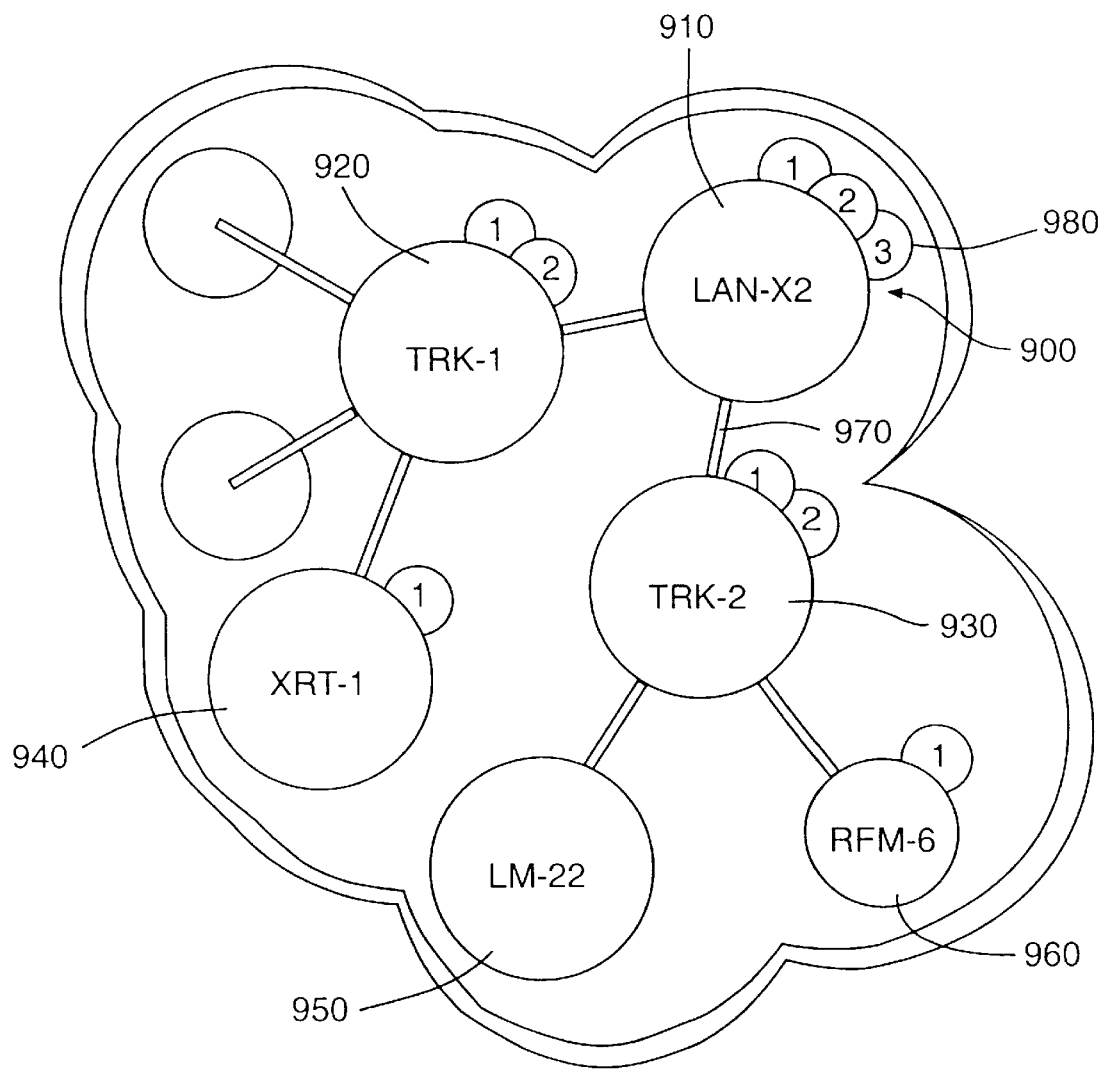
FIG. 9 illustrates a network browser software tool for simulating sub-networks associated with a network node consistent with the present invention.

The data browser software tool allows a user to categorically identify related portions of a large database to effectively navigate through and use the information stored in the database. To accomplish this objective, the data browser software tool uses a minimal number of windows to indicate the depth of hierarchy for one or more related database categories. FIGS. 7 through 9 illustrate examples of how computer system 140 implements the data browser software tool for specific applications.

FIG. 7 illustrates a sector cellsite data browser software tool for simulating a plurality of RF propagation layers corresponding to respective antenna groupings at a cellsite consistent with the present invention. This cellsite data browser tool enables a network manager to view layers of RF coverage for different antenna groupings.

In high traffic urban areas, service providers typically use multiple RF voice channels to support a high density of callers. These areas are usually covered by several antennas arranged vertically and/or radially on a cellsite tower. A number of these antennas may have similar physical properties. For example, the cellsite may have six antennas where three of the antennas are at one height and the remaining antennas are at another height. The network manager can view the RF propagation data for the first three antennas and then view the RF propagation properties for the remaining three antennas. The cellsite data browser software tool allows a network manager to view the RF propagation characteristics for each group of antennas having similar heights in the above example as well as each antenna in the group. By viewing RF propagation from the antenna groups, the network manager can pinpoint which antenna or antenna grouping may need adjustment.

As illustrated in FIG. 7, a network manager can view RF coverage for one or more sectors represented by one or more antennas and also select which antenna grouping to view using numerical tabs 700. Numerical tabs 700 include tabs "1" to "3" which identify the hierarchical relationship between each antenna grouping. By selecting tab "3", for example, the network manager can review RF propagation data for antenna grouping 720 which consists of three antennas. In this example, antenna grouping 720 provides RF propagation for one of a plurality of voice channels supported by the cellsite. The RF propagation data shown for each antenna in FIG. 7 is transparent to allow a user to view topographical and architectural data associated with the cellsite.

As shown in FIG. 7, a first antenna 721 of antenna grouping 720 provides RF coverage for a first sector 740. A second antenna 722 and third antenna 723 of antenna grouping 720 covers a second sector 760 and third sector 780, respectively. Graphical user interface 160 (shown in FIG. 1) allows the network manager to select other numerical tabs illustrated in FIG. 7 to view other antenna groupings. The display of other antenna groupings may be similar to that illustrated for antenna grouping 720. The numerical tab currently activated should indicate which antenna grouping is on the display. This feature can be accomplished using color codes or other type of visual effects. In addition, the cellsite data browser software tool not only displays the number of sectors, but also the size and shape of each sector as shown in FIG. 7. With the above-noted features, this particular data browsing tool allows a network manager to effectively troubleshoot antenna problems experienced at the cellsite and also make any necessary adjustments to improve RF coverage for a specified geographical area.

FIG. 8 is a flowchart illustrating a method of manipulating and displaying RF propagation data for selected antenna groups at a cellsite. The method begins with storing RF propagation data corresponding to each antenna and antenna group at a cellsite (step 800). Preferably, sonar mapping techniques are used to generate RF propagation data for each antenna and antenna group located at the cellsite. Subsequently, computer system 140 displays the RF propagation data for each antenna group (step 820). Finally, the network manager can manipulate the propagation data for each simulated antenna group on computer system 140 and make any necessary adjustments through graphical user interface 160 (step 840). Any changes that the network manager makes on the simulated display may be communicated to one or more cellsites in order to implement the simulated changes.

FIG. 9 provides another example of how a data browser software tool consistent with the present invention may be used to interpret and navigate through large amounts of data. In this example, computer system 140 uses the data browser software tool to identify sub-networks associated with a generic wireline communications network 900. Network 900 consists of a plurality of nodes including LAN-X2 node 910, TRK-1 node 920, TRK-2 node 930, XRT-1 node 940, LM-22 node 950, and RFM node 960. The plurality of nodes communicate with one another through trunk lines 970. Each of the network nodes shown in FIG. 9 are at the same hierarchical level within network 900. With the exception of LM-22 node 950, each node includes one or more sub-networks identified by numerical tabs 980. Hence, if a user selects tab "1" of LAN-X2 node 910 through graphical user interface 160, computer system 140 displays the first hierarchical sub-network level of the selected node. Accordingly, if a user selects tab "2" of LAN-X2 node 910, computer system 140 displays the second hierarchical level of the selected node. Similar to the example of FIG. 7, graphical user interface 160 uses visual effects to identify a selected hierarchical level displayed on computer system 140. For example, when a user selects tab "1" of LAN-X2 910, computer system 140 disables tab "1" (e.g., using a grey color) and keeps the other tabs active (e.g., using a red color). Alternatively, the data browser software tool may be used in the medical field to show biological entity networks or in the utility field to show piping networks (e.g., hydro lines, oil refinery pipelines, etc.). Regardless of the application, the data browser software tool immediately indicates to a user the number of sub-layers associated with a main network layer. This feature allows the user to simultaneously view and navigate through multiple networks or groups of data using a single graphical user interface window generated by computer system 140.

Figure 10A:
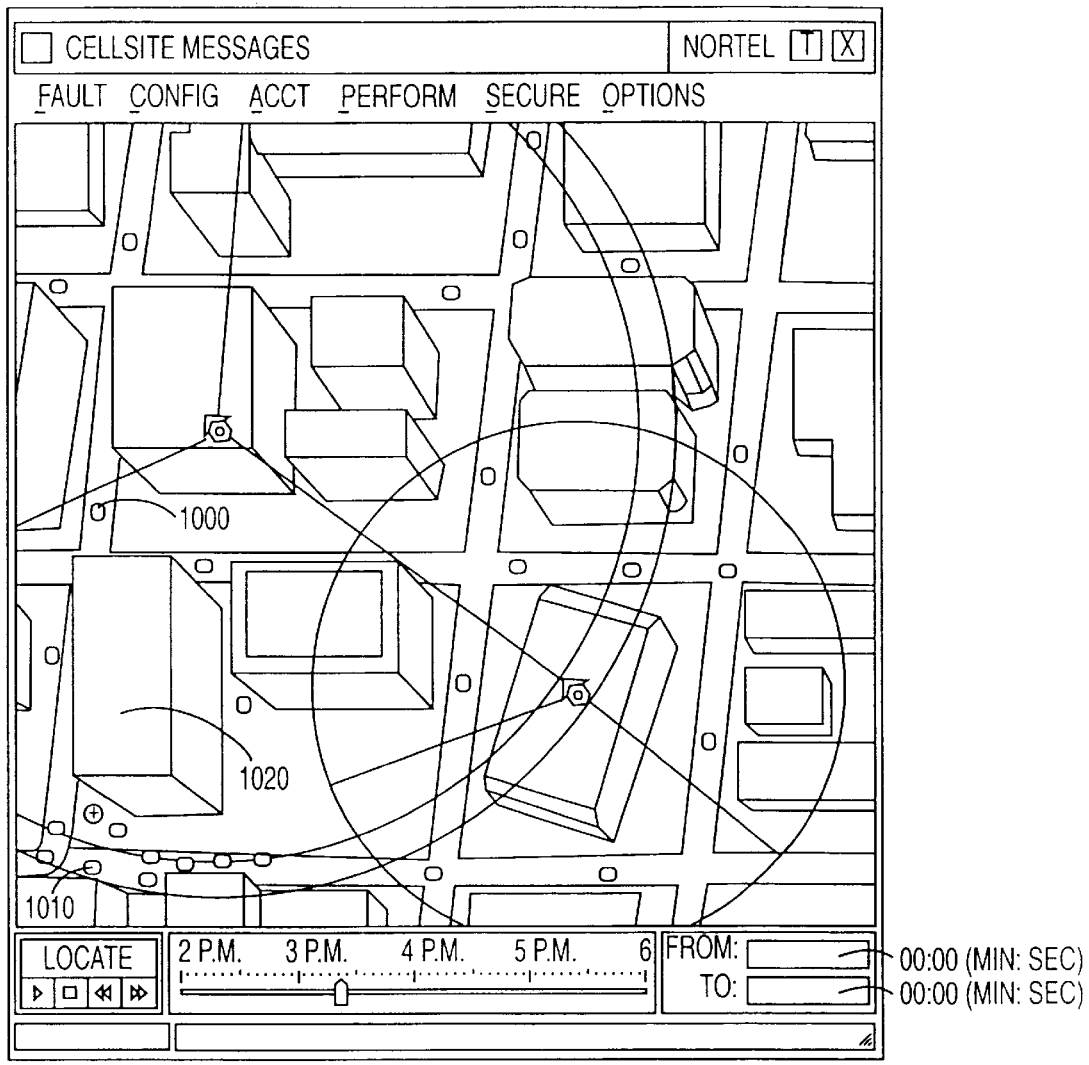
FIG. 10a illustrates a historical traffic performance viewer software tool for simulating a subscriber's location within or around a cellsite when placing a call consistent with the present invention.
Figure 10B:
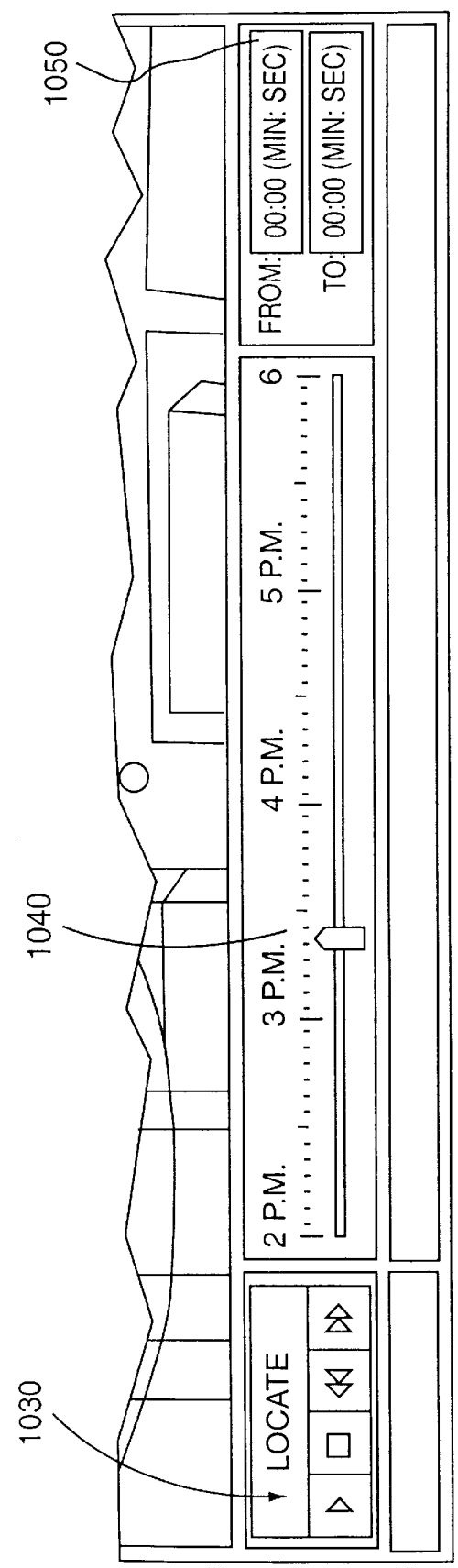
FIG. 10b is a control screen for controlling parameters associated with the simulated cellsite of FIG. 10a over a period of time.

The historical traffic performance software tool allows a user to simulate historical and current traffic patterns for a variety of applications. These applications may include air traffic control, wireless communications subscriber tracking, or any other application that involves tracking the movement of objects or people over time. FIGS. 10*a* and 10*b* illustrate examples of how computer system 140 implements the historical traffic performance software tool for specific applications.

FIG. 10*a* illustrates a historical traffic performance viewer software tool for simulating a subscriber's location within or around a cellsite when placing a call consistent with the present invention. In this example, computer system 140 uses subscriber data to simulate subscriber location tracking when connection problems occur (i.e., when wireless communication subscribers encounter problems making calls on their mobile phones). This feature provides the network manager with a tool for monitoring subscriber traffic patterns during various time periods. During these periods, system 100 implements the historical traffic performance tool to identify a problem subscriber location and determine appropriate adjustments. An enhanced 911 service, for example, may be used to identify a subscriber's locations within a specified geographical area. The enhanced 911 service locates a subscriber using a method such as triangulation and allows for the location of one or more subscribers to be defined over a period of time. Although enhanced 911 service is not the only way of identifying a subscriber's location within a geographical area, this particular service provides an accurate and efficient method of acquiring this information.

Preferably, a network manager accumulates subscriber and subscriber location data over time to generate a view of subscriber traffic patterns and possible problem areas. As with the embodiments discussed above, additional cellsite data may be used in conjunction with the subscriber and subscriber location data to provide the network manager with an overall picture of cellsite operations. Included in this additional data may be topographical, architectural, and street map data.

Referring now to FIG. 10*a*, a network manager can view the location of a first subscriber 1000 in relation to one or more antennas fixed at a cellsite using the graphical user interface capabilities of the historical traffic performance software tool. By viewing the cellsite information of FIG. 10*a*, the network manager can determine which subscribers are receiving service and which subscribers are not. For example, first subscriber 1000 in FIG. 10*a* can successfully connect with the cellsite based on their location within the cellsite. However, a second subscriber 1010 cannot connect to the cellsite because of architectural obstruction 1020. Upon viewing this problem, the network manager may adjust one or more of the antennas in one or more cellsites to ensure that second subscriber 1010 can successfully connect to the network.

Using the cellsite tuning software tool illustrated in FIGS. 3a and 3b, the network manager can also simulate antenna adjustments and view the resulting RF propagation coverage. When the network manager has made the appropriate adjustments, this information can be forwarded to one or more cellsites to allow the appropriate adjustments to be made.

FIG. 10b is a control screen for controlling parameters associated with the cellsite of FIG. 10a over a period of time. This control screen may also be used for other software tools described herein to control simulated cellsite operations over a period of time. For the historical traffic performance software tool, the control screen allows the network manager to select one or more locating functions 1030 to locate the position of one or more subscribers within and around the cellsites during a selected period of time. These locating functions include playing a simulated image of subscriber movement within the cellsite during a specified period of time. The simulated subscriber movement can be played in real-time. The network manager can also fast forward, rewind, or stop the simulation using locating functions 1030.

The network manager can adjust a slider bar 1040 (e.g., using a mouse) for viewing cellsite operation during a selected time period. This feature allows the network manager to determine when RF coverage is troublesome for certain geographical areas within the cellsite. Upon identifying this information, the network manager can make adjustments during critical time periods to ensure that subscribers have sufficient coverage for high traffic periods. The historical traffic performance software tool enhances the accuracy of network management system 100 by allowing the network manager to track RF coverage for a period of minutes or even seconds on a clock display 1050. This allows a network manager greater flexibility when adjusting cellsite parameters to accommodate a large volume of subscribers within a specified time period.

As described herein, data manipulation and visualization software tools consistent with the present invention allow a user to view, manipulate and organize complex data in a simulated environment. These software tools may be used for a variety of applications, such as to effectively plan and operate one or more cellsites within a wireless network. Using this application as an example, a network manger can simulate desired antenna tuning adjustments before actually adjusting the cellsite antenna. In addition, the data manipulation and visualization tools provide the network manager with detailed views of RF coverage in a variety of planes to effectively troubleshoot RF propagation problems. Further, the network manager can use these tools to browse RF coverage generated by a cellsite, and more specifically, each cellsite antenna grouping. The software tools also facilitate tracking a subscriber's location over a specified period of time to locate potential problems for subscribers using the network. Finally, the software tools employed by system 100 allow a network manager to view a plurality of cellsite data on a single screen to effectively monitor how certain adjustments affect existing cellsite conditions.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A data manipulation and visualization tool, comprising:
   means for storing a plurality of data corresponding to a plurality of distinct information layers;
   means for representing the plurality of distinct information layers as a plurality of integrated visual images on a single display screen;
   means for selecting one of the integrated visual images; and
   means for simulating a characteristic of the distinct information layer corresponding to the selected integrated visual image.

2. The tool of claim 1 wherein the representing means include means for displaying the plurality of integrated visual images as transparent images.

3. The tool of claim 1 wherein the selecting means includes means for selecting one of the integrated visual images using a graphical user interface.

4. The tool of claim 1 further comprising means for visually identifying hierarchical associations between each distinct information layer.

5. The tool of claim 1 wherein the representing means includes means for displaying the integrated visual images as visually distinct objects.

6. The tool of claim 5 wherein the displaying means includes means for displaying the integrated visual images as two-dimensional images.

7. The tool of claim 5 wherein the displaying means includes means for displaying the integrated visual images as three-dimensional images.

8. A method for data manipulation and visualization, comprising the steps of:
   storing a plurality of data corresponding to a plurality of distinct information layers;
   representing the plurality of distinct information layers as a plurality of integrated visual images on a single display screen;
   selecting one of the integrated visual images; and
   simulating a characteristic of the distinct information layer corresponding to the selected integrated visual image.

9. The method of claim 8 wherein the representing step include the step of displaying the plurality of integrated visual images as transparent.

10. The method of claim 8 wherein the selecting step includes the step of selecting one of the integrated visual images using a graphical user interface.

11. The method of claim 8 further comprising the step of visually identifying hierarchical associations between each distinct information layer.

12. The method of claim 8 wherein the representing step includes the step of displaying the integrated visual images as visually distinct objects.

13. The method of claim 12 wherein the displaying step includes the step of displaying the integrated visual images as two-dimensional images.

14. The method of claim 12 wherein the displaying step includes the step of displaying the integrated visual images as three-dimensional images.

15. A method for data manipulation and visualization, comprising the steps of:

storing a plurality of data corresponding to a plurality of distinct hierarchical information layers;

representing the plurality of distinct information layers at a first hierarchical level as a plurality of integrated visual images on a single display screen;

displaying a visual indicator to identify the existence of a second hierarchical level corresponding to one of the plurality of integrated visual images on the display;

selecting the visual indicator; and generating another plurality of integrated visual images corresponding to the second hierarchical level on the display screen.

16. The method of claim 15 wherein the displaying step includes the step of displaying the visual indicator as a color tab.

17. The method of claim 15 wherein the displaying step includes the step of displaying the visual indicator adjacent the one integrated visual image.

18. The method of claim 15 wherein the selecting step includes the step of changing a visual effect of the visual indicator when selected.

19. A method for data manipulation and visualization, comprising the steps of:

storing a plurality of historical performance data;

representing the plurality of historical performance data on a single display screen using visually distinct objects;

simulating the movement of the visually distinct objects to emulate a historical performance; and controlling the time period of the historical performance emulation.

20. The method of claim 19 wherein the representing step includes the step of representing the plurality of historical performance data as a three-dimensional image.

* * * * *